Jan. 3, 1939.　　　　　　C. E. JOOS　　　　　2,142,515
WATER SOFTENING SYSTEM
Filed May 23, 1935　　　2 Sheets-Sheet 2

Inventor:
Charles E. Joos
By Cornelius L. Ebret
Attorney.

Patented Jan. 3, 1939

2,142,515

UNITED STATES PATENT OFFICE 2,142,515

WATER SOFTENING SYSTEM

Charles E. Joos, Philadelphia, Pa., assignor to Cochrane Corporation, Philadelphia, Pa., a corporation of Pennsylvania Application May 23, 1935, Serial No. 22,968

6 Claims. (Cl. 210—16)

My invention relates to methods of softening water to be used for any purpose, more particularly for industrial purposes, including the softening of boiler feed water.

In accordance with my invention relatively soft raw water, or relatively hard raw water which to substantial extent has been softened, is treated, while hot, by addition of suitable softening reagent or reagents such as, or the equivalent of a sodium phosphate alone, or with caustic soda or equivalent depending upon the causticity of the water before or desired after treatment, in proportion or proportions preferably automatically controlled in relation to the rate of flow or amount of water to be treated, and more particularly to procure or maintain in the treated water a suitable excess of phosphate, generally in the form of tri-sodium phosphate, and/or to procure or maintain in the treated water a suitable concentration of free alkali when that is desirable.

My invention resides in the methods of the character hereinafter described.

For an understanding of my method and illustration of apparatus embodying my invention and utilizable for practicing my methods, reference is to be had to the acompanying drawings, in which.

Figure 1:
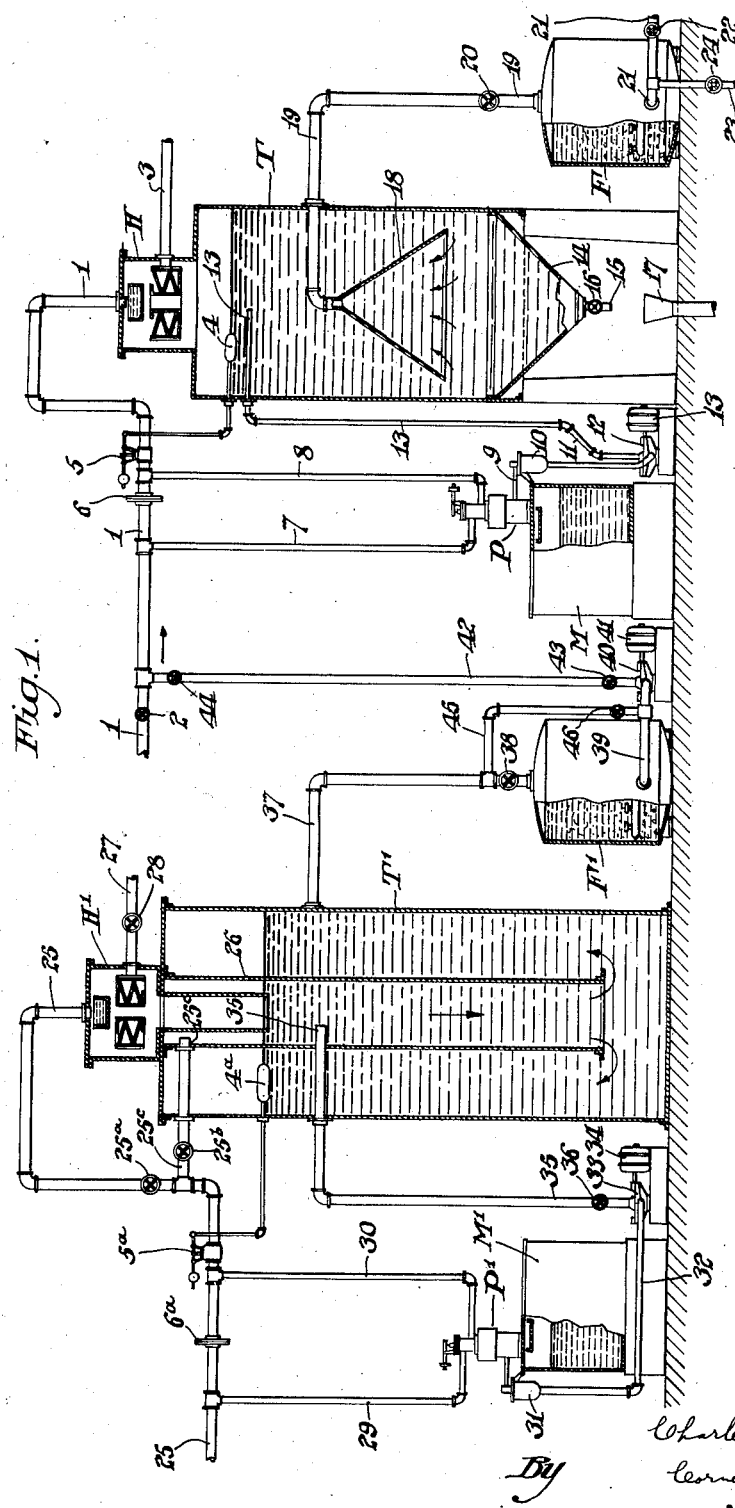
Figure 1 illustrates in vertical section, partly in elevation, water softening apparatus in accordance with my invention.

When the raw water is naturally relatively soft, as when containing about 3 grains or less per gallon of hardness imparting compounds, generally magnesium and calcium compounds, it may be introduced into the treating system through the pipe 1, controlled by valve 2, which delivers into the top of the tank T, in which the softening reactions and sedimentation take place. The pipe 1 delivers water first to a water heater H of any suitable type, in the example illustrated of the open type, provided with exhaust steam or equivalent through the pipe 3. The water for softening purposes is heated to a temperature of 205° F. or higher, depending upon the pressures prevailing. A float 4, upon the water in the tank T, automatically controls the delivery of water into the tank T in accordance with the demand by controlling the valve 5 in line 1.

In the line 1 is interposed an orifice plate 6 between opposite sides of which in the pipe 1 there is developed a difference in pressure dependent upon the rate of flow of water through the line 1 on its way to the tank T. Pipe connections 7 and 8 are made to opposite sides of the orifice plate 6 and transmit the differential pressure to the chemical proportioner P, such, for example, as that described in U. S. Patent No. 1,262,730, to which the chemical reagent is continuously supplied, as from the chemical mixing tank M into which predetermined weights of chemical reagent or reagents is or are charged at suitable or regular intervals, and in which they are kept in uniform suspension or solution by means of any suitable agitator or propeller, not shown. The chemical from tank M is continuously circulated to the proportioner P, the excess returning into the chamber M. The proportioner P delivers through the pipe 9 the necessary chemical or chemicals, in proportion to the rate of flow of water through the orifice plate 6, into the receptacle 10, from which it passes through pipe 11 to the chemical pump 12, driven by motor 13a. The pump 12 delivers the reagent or reagents, proportioned as aforesaid with respect to the rate of flow of the water through the orifice 6, through the pipe 13 into the tank T, preferably near or above the water level therein.

The reagent or reagents so introduced into tank T react with the hardness imparting compounds in the water, producing a precipitate or precipitates, settling downwardly through the water in the tank T, so sedimentizing and collecting in the bottom 14 from which the sediment may from time to time be withdrawn through draw-off pipe 15, controlled by valve 16, and discharged into the receptacle 17 communicating with sewer or other destination.

The water so treated rises upwardly through the up-take funnel 18, passes out through the pipe 19, controlled by valve 20, to the filter F, generally though not necessarily employed. In the filter any remnant solid matter or sediment is filtered out, and the filtered softened water passes off through the line 21, controlled by valve 22, to boiler feed pump, to be fed to steam generators or boilers, or to any other destination where the softened water is to be utilized.

The treating reagent may be tri-sodium phosphate, mixed in tank M and proportioned by the proportioner P as aforesaid and delivered into the tank T, where it reacts as aforesaid with the hardness imparting compounds, generally calcium compounds, and effects a softening preferably to that degree commonly known as "zero hardness", corresponding approximately with a remaining hardness of about .2 to .3 grain per gallon, or less.

The amount or proportion of tri-sodium phosphate fed into the tank T is desirably and preferably such that in the water so softened there shall exist an excess of tri-sodium phosphate, as of the order of 5 parts per million by weight.

To assure such excess of tri-sodium phosphate there may be drawn off, as from the line 19, or preferably from pipe 21 through a sampler pipe 23, controlled by valve 24, samples of the treated water, at suitable or substantially regular intervals, which are tested to determine the amount of tri-sodium phosphate present. In accordance with the results of such tests, the rate of introduction of reagent into the system, preferably nevertheless proportioned by the proportioner P, or equivalent, with relation to the rate of flow of water through the line 1, is adjusted or controlled to assure in the treated water the desired degree of excess of tri-sodium phosphate.

There may be utilized with the tri-sodium phosphate reagent, any other suitable reagent, particularly sodium hydroxide in proportion or amount depending usually upon the magnesium hardness imparting content of the water delivered through the line 1 to cause formation in the tank T of magnesium precipitates, so contributing to the softening of the water; and the sodium hydroxide or equivalent reagent may be proportioned also with respect to or in accord with the hydrogen ion concentration of the raw water in line 1, the greater the amount of alkali in the raw water so charged the less sodium hydroxide need be added.

The sodium hydroxide may be mixed with the tri-sodium phosphate each in proportion as required, and in mixture proportioned by the proportioner P and delivered into the tank T; or the sodium hydroxide may be separately proportioned by a further proportioner and delivered into the tank T.

Where the treated water delivered from the system is required to have or contain a predetermined amount of free alkali, represented for example by a hydrogen ion concentration of pH 8.5, or more or less as may be required, that proportion is maintainable by testing the hydrogen ion concentration of samples taken through pipe 23, for example, and the amount of sodium hydroxide added to the water is correspondingly adjusted or controlled to secure in the effluent the desired excess of free alkali.

When the water delivered into the treating chamber T is relatively high in causticity, then containing free alkali ordinarily sufficient in amount including or not that effecting excess of free alkali in the treated water, the reagent proportioned and delivered through the pipe 13 into the water to be treated may be di-sodium phosphate. With free alkali present in the water with the di-sodium phosphate, the latter becomes converted into tri-sodium phosphate, with the effects above indicated when tri-sodium phosphate is introduced through pipe 13 as a softening reagent. In this case again the amount of di-sodium phosphate introduced is proportioned in relation to the rate of flow of water to be treated into the tank T and particularly it is so proportioned that in the water after the softening treatment there is present in desired excess or amount tri-sodium phosphate. And the free alkali in the treated water may be of any desired amount, corresponding for example with a hydrogen ion concentration of value pH 8.5, or more or less.

When the amount of free alkali in or the causticity of the water introduced into the chamber T is still higher than in the case where the reagent employed is di-sodium phosphate, monosodium phosphate may be used as a softening reagent. In this case again there is a conversion to tri-sodium phosphate; and the amount of mono-sodium phosphate introduced is preferably so proportioned that in the treated water there will be a desired excess of tri-sodium phosphate; and the alkalinity of the treated water may again be such as may be afforded by the causticity in the water to be treated, or to provide in the treated water a hydrogen ion concentration of magnitude pH 8.5 or higher or lower.

It is characteristic of all the aforesaid treatments that the amount of sodium phosphate introduced is proportioned and controlled in accord with a desired excess or amount of tri-sodium phosphate in the treated water; and in the case of addition of sodium hydroxide it is or may be proportioned and controlled in accord with a desired excess or amount in the treated water to effect or provide therein a hydrogen ion concentration of a value of pH 8.5, or greater or less.

The filter medium in filter F may be of any character suitable for the purposes in view. When the hot treated water delivered to the filter through pipe 19 contains free alkali, as aforesaid, the filter medium, particularly when the water is to constitute boiler feed water, may consist of magnetic iron ore, anthracite coal, and, in general, any other suitable non-siliceous material. Though calcium carbonate, such as calcite, has been used for filtering hot alkaline water, a filter medium of such material should not be employed when in the treated water there is an excess of tri-sodium phosphate which would react therewith to form a precipitate of calcium phosphate, so reducing or consuming the excess of tri-sodium phosphate whose presence in the concentrated water within the boiler is desirable, particularly for boiler pressures in excess of 250 lbs. per square inch, to prevent deposit in the boiler of siliceous or hard scale, and, in general, when there is an excess of tri-sodium phosphate in the hot treated water the filter medium should not be of any other material which would react with the tri-sodium phosphate to form a precipitate, especially when the treated water is to constitute boiler feed water.

When the raw or other water to be treated is relatively hard, as when containing substantially more than about 3 grains of hardness imparting compounds per gallon, it is or may be preliminarily softened, as by treatment, either hot or cold, with lime (calcium hydroxide) or by lime and soda ash, or other equivalent reagent or reagents. The water so preliminarily softened then becomes the water introduced into the softening tank T, and is there treated as hereinbefore described.

When such preliminary softening is required or desired, the relatively hard water is delivered through the pipe 25 into the downtake mixing and reaction chamber 26 of and within the preliminary softening chamber T'.

The water so introduced, when the preliminary softening treatment is to be effected while the water is hot, may be passed through any suitable heater, such, for example, as the heater H' here indicated as of the open type, to which exhaust or other steam is admitted through pipe 27 controlled by valve 28.

When the water is to be treated while cold, the valve 25a may be closed, and the valve 25b opened, in which case the raw water will pass directly through pipe 25c into the chamber 26.

In the line 25 is introduced an orifice plate 6a, the differential pressure on opposite sides of which, representing the rate of flow therethrough of the water to be treated, is communicated through the pipes 29 and 30 to the reagent proportioner P' which proportions the reagent or reagents with relation to the rate of flow of the water delivered to the softener. The reagent or reagents are in solution or suspension in the mixing tank M' from which there is a continual circulation from the proportioner P' by mechanism (not shown) similar to that described in connection with proportioner P. The proportioned reagent or reagents are delivered from the proportioner to the receptacle 31, then passing through pipe 32 to the pump 33, driven by motor 34, and delivered through the pipe 35, controlled by valve 36, into the interior of the aforesaid chamber 26.

During its descent through the chamber 26 the hot or cold water is softened, and any precipitate or sludge formed may be drawn off at or adjacent the bottom of the tank T' by any suitable means, not shown.

Float 4a controls valve 5a to admit water into the system in accordance with the demand, maintaining an approximately constant water level in chamber T'.

The water passes from the open lower end of the chamber 26 into chamber T' upwardly therein and out through the pipe 37 through control valve 38 into the filter F', whose filtering material may be any suitable material. The filtered water passes from filter F' through pipe 39 to pump 40, driven by motor 41, and is delivered through the pipe 42, controlled by valve 43, to the pipe 1 of the system above described.

When the preliminary softening system is employed, the valve 2 is closed and the valve 44 opened.

The filter F' may be by-passed when suitable or desirable through the pipe 45 controlled by valve 46. And it shall be understood filter F may similarly be by-passed if and when desirable.

The water, either cold or hot, delivered through pipe 42 is softened generally to the point where the content of hardness imparting compounds has been reduced to about 3 grains per gallon, or lower, and by further softening in tank T "zero hardness", or other desired degree of hardness is procured.

Figure 2:
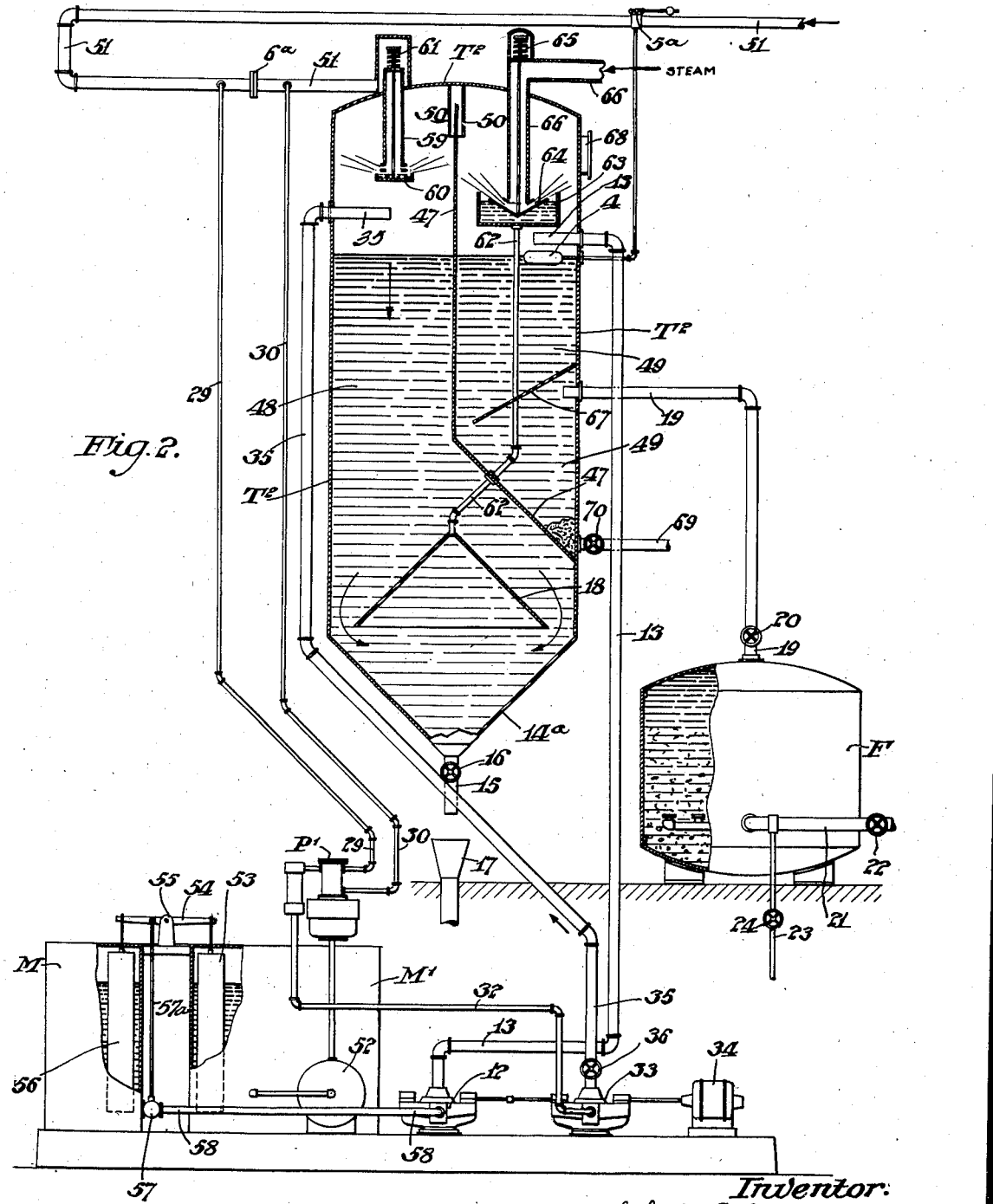
Fig. 2 is a vertical sectional view, partly in elevation, of a modified form of apparatus for practicing my invention.

In Fig. 2 the preliminary softening, such as effected in tank T' of Fig. 1 and the subsequent softening such as effected in tank T of Fig. 1, are effected in one and the same tank or container T² provided with the partition or dividing wall 47 to provide on the left thereof the preliminary softening chamber 48 and on the right thereof the chamber 49 for the subsequent softening treatment. The spaces above the two chambers may be in baffled communication with each other over the upper end of the partition 47 which projects into the interspace between the baffle plates 50, 50. The relatively hard water, such as delivered through pipe 25, Fig. 1, is introduced through the pipe 51 in which is the valve 5a controlled by the float 4, for controlling inlet of raw water in accord with demand upon the system for treated water.

In line 51 is provided an orifice plate 6a for effecting on opposite sides thereof a differential pressure, related to the rate of flow of water into the system, which is communicated through pipes 29 and 30 to the proportioner P' which, as in the case of Fig. 1, has continuously circulated thereto, as by suitably driven pump 52, from mixing tank M' the lime or lime and soda reagents, which, suitably proportioned to the rate of delivery of water to the softening system, is delivered from the proportioner through pipe 32 to pump 33, driven by motor 34, which delivers the proportioned reagent or reagents through pipe 35, controlled by valve 36, into the aforesaid chamber 48.

Immersed in the liquid in tank M' is the displacement weight 53 suspended from a balance arm 54, pivoted at 55; suspended from the other end of the arm 54 is the displacement weight 56 immersed in the liquid in tank M containing the reagent or reagents for the subsequent or final softening process in aforesaid chamber 49. As the level of the liquid in tank M' changes, in accord with application of reagent or reagents, proportioned by the proportioner P', to the tank 48, the displacement weight 53 will tend to fall, so unbalancing the system comprising the displacement weights 53 and 56 and beam 54. When due to unbalance the weight 56 rises, the valve 57, whose adjustable member is connected to beam 54 by member 57a, is opened or further opened, so controlling delivery of the reagent or reagents, destined for chamber 49, through pipe 58 to the pump 12, driven by motor 34, which delivers through conduit 13 into chamber 49 the reagent or reagents for the second or final softening treatment.

The last named reagent or reagents, to be delivered to chamber 49, are, through the weight and beam structure described, proportioned in accord with the rate of delivery of raw water to the softening system.

The raw water delivered through pipe 51 passes downwardly through tube 59 toward whose lower end spring 61 biases the plate 60. The pressure of the water entering forces plate 60 away from the end of the tube 59, in opposition to spring 61, so delivering the water into the chamber 48 in the form of jets or sprays. It shall be understood however that either direct or any other method of introduction of water into chamber 48 may be resorted to.

The lime, or lime and soda ash, introduced into the water in chamber 48 reduces the hardness, in either hot or cold treatment, to a suitably low quantity, such for example as approximately 3 grains of hardness imparting compounds per gallon. The precipitate or sludge so formed gathers in the bottom of the tapered portion 14a of tank T2, and may be drawn off from time to time through pipe 15, controlled by valve 16, into sewer connection 17.

The preliminarily treated water passes around the lower edge of the funnel 18, and passes upwardly through pipe 62 to be delivered directly or in any way into the chamber 49. In the example illustrated pipe 62 delivers through the bottom of tray 63, in the water in which is immersed the conical member 64 adapted under the lifting effect of spring 65 to hold it against the complementary end of the conduit 66 through which exhaust or other steam is introduced. Under the pressure obtaining, the member 64 is moved away from the lower end of conduit 66, allowing the escape of steam in jet form, coming into contact with and de-aerating the water, which being so heated by the steam passes downwardly into the chamber 49.

Where a de-aerator is not employed, there may be provided any other suitable means for heating the water entering chamber 49 from chamber 48. This may be effected by steam delivered through the connection 68 to any suitable type of heater within the space above the water in chamber 49, or steam from supply 68 may pass through the upper end of chamber 49, around baffle structure 50, 50, into the top of chamber 48 into contact with the jets or sprays of the incoming raw water, and so heating it to provide the water temperature desired in chamber 49.

At the same time the reagents, such as any of the sodium phosphates and/or sodium hydroxide referred to in connection with the treatment of tank T of Fig. 1, are continuously delivered into the water in chamber 49, in proper proportions, especially to maintain in the treated water any desired excess of tri-sodium phosphate only, or both tri-sodium phosphate and sodium hydroxide.

The water descending in chamber 49 passes around baffle 67, and thence to the outlet pipe 19, controlled by valve 20, which delivers into the filter F of the character, particularly as to filter medium, of and for the purposes described in connection with filter F, Fig. 1.

The treated water is drawn off from the filter through the pipe 21, controlled by valve 22, either to boiler feed or for use for any other purpose. The precipitate or sludge formed in chamber 49 collects below baffle 67 in the lower end of the tapered bottom portion of chamber 49, and is drawn off through pipe 69 controlled by valve 70.

From time to time samples of the treated water may be drawn off through the sample pipe 23 controlled by valve 24, for purposes of tests for the amount of tri-sodium phosphate and/or alkali in the treated water. The process in chamber 49 is again characterized by application of reagent controlled in accord with the excess of any of the reagents in the treated water, as described in connection with the process effected in tank T of Fig. 1.

The apparatus shown in Fig. 2, as exemplary of apparatus suited for practice of my methods of water softening, is claimed in my copending application Serial No. 233,734, filed October 7, 1938.

What I claim is:

1. The method of softening water which comprises treating it in a reaction zone with lime and soda to reduce the hardness to the order of 3 grains of hardness imparting compounds per gallon and of low alkali content, in a second reaction zone treating the water from said first-named zone with tri-sodium phosphate and sodium hydroxide in proportions, respectively, to provide in the treated water an excess of tri-sodium phosphate of the order of 5 parts per million by weight and an excess of sodium hydroxide corresponding with the hydrogen ion concentration of the order of pH 8.5, and heating the water prior to its treatment in said second reaction zone.

2. The method of softening water having a hardness of more than 3 grains of hardness imparting compounds per gallon, which comprises treating it with reagent in proportion to reduce the hardness to the order of 3 grains per gallon of hardness imparting compounds, and thereafter further reducing the hardness of the treated water by treating the same while hot with sodium hydroxide and a sodium phosphate in proportions to provide in the treated water an excess of tri-sodium phosphate and an excess of alkali corresponding with a hydrogen ion concentration of the order of pH 8.5.

3. The method of softening water having a hardness of the order of 3 grains of hardness imparting compounds per gallon, which comprises treating the same while hot with a sodium phosphate and sodium hydroxide in proportions materially to reduce the hardness and provide in the treated water an excess of tri-sodium phosphate and a causticity corresponding with a hydrogen ion concentration of the order of pH 8.5, and filtering the treated water through a filter medium of character not to enter into precipitate-forming reaction with the tri-sodium phosphate.

4. The method of softening water of high initial causticity and having a hardness of the order of 3 grains of hardness imparting compounds per gallon, which comprises treating the same while hot with a sodium-phosphate in proportion materially to reduce the hardness and provide in the treated water an excess of tri-sodium phosphate of about 5 parts per million by weight and an excess of alkali corresponding with a hydrogen ion concentration of the order of pH 8.5, and filtering the treated water while hot through a filter medium non-siliceous in character and substantially free of calcium compounds of a character reacting with tri-sodium phosphate to produce a precipitate.

5. The method of softening water having a hardness of more than 3 grains of hardness-imparting compounds per gallon, which comprises treating it in a reaction zone with lime and soda to reduce the hardness to the order of 3 grains of hardness-imparting compounds per gallon, in a second reaction zone treating the water with a phosphate of sodium and sodium hydroxide in proportions to reduce the hardness to substantially zero and to provide in the treated water an excess of tri-sodium phosphate of the order of 5 parts per million by weight and a hydrogen ion concentration of the order of pH 8.5, heating the water to at least 205° F. prior to its treatment in said second reaction zone, and after treatment in said second zone filtering the water while hot through a filter medium non-siliceous in character and including magnetic iron ore and anthracite coal.

6. The method of softening water which comprises treating it with reagents in proportions to reduce the hardness to the order of 3 grains per gallon of hardness imparting compounds, thereafter heating the water to a temperature of at least 205° F., and reducing the hardness of the heated water to zero hardness by treating the same with reagents in proportions to maintain an excess of alkali corresponding to a hydrogen ion concentration of the order of pH 8.5 and including a phosphate of sodium in proportion to provide in the treated water an excess thereof of the order of 5 parts per million by weight.

CHARLES E. JOOS.